2,910,497

N-(DIALKYLTHIOCARBAMYL-MERCAPTO-METHYL) DERIVATIVES OF GUANIDINE COMPOUNDS, USEFUL AS BACTERICIDES AND RODENT REPELLENTS

Walter C. Meuly, Mill Creek Hundred, Del., assignor to E. I. du Pont de Nemours and Company, Wilmington, Del., a corporation of Delaware No Drawing. Application August 5, 1957
Serial No. 676,402

5 Claims. (Cl. 260—455)

This application is a continuation-in-part of my application Serial No. 457,545, filed September 21, 1954 (abandoned December 10, 1957).

My invention deals with novel organic compounds which are useful as bactericides, rodent repellents, and in related fields. The novel compounds of this invention may be designated broadly as N-(dialkylthiocarbamyl-mercaptomethyl) derivatives of guanidine compounds, and are expressible by the general formula

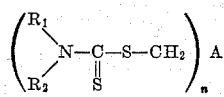

wherein $n$ is an integer from 1 to 2, $R_1$ and $R_2$ are lower alkyl radicals, while A is the radical obtained by removing $n$ H-atoms from the amido groups of a guanidine compound. By the latter name I mean a compound of the formula

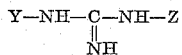

wherein Y stands for hydrogen, lower alkyl, or aryl, and Z designates hydrogen, lower alkyl, aryl, cyano, amidino, or arylamidino. In this definition, as well as throughout the discussion herein, lower alkyl refers to alkyl radicals of 1 to 4 C-atoms, while aryl may be illustrated by phenyl, tolyl, chloro-phenyl, bromophenyl, xylyl, and other monocyclic aryl compounds which are free of ionizable substituents (such as sulfo, carboxy, hydroxy or amino).

As specific illustrations of the various guanidine compounds which come under the above definition may be mentioned guanidine, methyl guanidine, phenyl guanidine, 1,3-diphenyl guanidine, 1,3-di-o-tolylguanidine, dicyandiamide, biguanide, tolyl-biguanide, and 1-p-chlorophenyl-5-isopropyl biguanide.

My novel compounds may be synthesized by methods analogous to those described in my copending application Serial No. 526,571 (Patent No. 2,842,583, issued July 8, 1958), that is by reacting one mole of the chosen guanidine compound with 1 or more moles (depending on the value of $n$ aimed at) of a dialkyl-dithiocarbamic acid and $n$ moles of formaldehyde, in an aqueous medium under conditions which discourage the tendency to form an intermediate guanidine methylol compound. The reaction is preferably effected at a temperature not exceeding 60° C. The aqueous medium may consist of water alone or a mixture of water with one or more water-miscible solvents, for instance acetone. The requisite dialkyl-dithiocarbamic acid is generally formed in situ either from its components, that is the corresponding dialkyl amine and carbon disulfide or from its alkali-metal salt, for instance sodium dialkyl-dithiocarbamate, by feeding into the reaction mass controlled amounts of a relatively weak acid, such as acetic, tartaric, formic, citric or boric.

The order of mixing the reactants is generally immaterial, as long as the guanidine and the formaldehyde are not allowed to be in contact with each other in the absence of the other reagents for a prolonged length of time. At temperatures above 60° C., the process is still operative, but the yield is apt to go down.

Without limiting this invention, the following examples are given to illustrate my preferred mode of operation. Parts mentioned are by weight.

*Example 1*

143 parts of sodium dimethyl dithiocarbamate, 84 parts of 1-cyanoguanidine (dicyandiamide), and 33 parts of formaldehyde in the form of a commercial 37% water solution were mixed with 400 parts of water. While agitating the mixture efficiently at 20° to 40° C., 60 parts of acetic acid (in dilute form) were added thereto at a slow rate, so as to keep the reaction mixture alkaline (pH above 7) at all times. A white, finely divided precipitate formed gradually. It was filtered off and washed first with warm water and then with acetone. The resulting white crystalline material melted at 148° to 149° C. Its elemental analysis was in good agreement with the formula

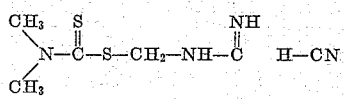

The product, therefore, constitutes 3-cyano-1-(dimethyl-thiocarbamyl-mercaptomethyl)-guanidine.

*Example 2*

45 parts of dimethylamine in the form of a commercial 40% aqueous solution are diluted with 450 parts of water. 84 parts of 1-cyano-guanidine are added to the dimethylamine solution, forming a slurry. To the agitated slurry are gradually added 30 parts of formaldehyde in the form of a commercial 37% aqueous solution, at a temperature of 20° to 30° C. Addition of 76 parts of carbon disulfide is begun at once, with agitation, while maintaining the temperature at 25 to 30° C. When about one-fourth of the carbon disulfide has been added, a white, fine precipitate begins to form which increases rapidly forming a white paste when all the carbon disulfide has been entered. Over the next 4 hours the temperature of the batch is gradually increased to 44° C. The product is filtered off and washed 6 times with 200 parts of water each. The insoluble cake is dried at about 50° C. to constant weight. 206 parts of a chalk-white fine powder is obtained which melts at 148° to 150° C. Elemental analysis of the product yields 29.4% sulfur and 32.2% nitrogen, agreeing closely with the formula given in Example 1. The product is obviously the same as in Example 1.

*Example 3*

When the amount of 1-cyanoguanidine in Example 2 is decreased to one half, i.e. 42 parts, a mixture of two products is obtained. The mixture consists of the product of Example 1, and a bis-compound of the formula

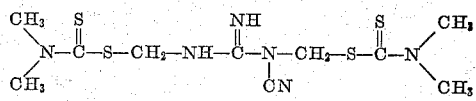

which is 1-cyano-1,3-bis(dimethylthiocarbamyl-mercaptomethyl)guanidine.

*Example 4*

239 parts of 1,3-di-o-tolylguanidine are mixed with 172 parts of sodium dimethyldithiocarbamate in the form of a 30% water solution. To this agitated slurry are added 36 parts of formaldehyde in the form of a 37% water solution at a temperature of 30 to 35° C. A thick white paste begins to form and the solution becomes strongly alkaline. During the next 4 hours 72 parts of acetic acid are added gradually in the form of a 24% aqueous solution. The speed of addition is adjusted so as to have an alkaline reaction (pH 7.5 to 9.0) throughout to prevent decomposing the dimethyldithiocarbamic acid. The temperature is maintained between 30° and 40° C. The white precipitate is filtered and is washed thoroughly with water to remove all soluble products. The chalk-white reaction product, which is water insoluble, is dried to constant weight at 50° to 60° C. The product melts at 121° to 124° C. Elemental analysis yields 15.3% nitrogen and 17.2% sulfur. These values are in good agreement with the compound of the formula below, which requires 15.1% nitrogen and 17.2% sulfur:

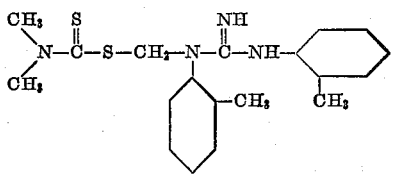

The product, therefore, constitutes 1-(dimethylthiocarbamylmercaptomethyl)-1,3-di-o-tolylguanidine.

*Example 5*

When the 239 parts of 1,3-di-o-tolylguanidine in Example 4 are replaced by 253 parts of 1-(p-chlorophenyl)-5-isopropylbiguanide, the reaction product is a white powder melting at 162° to 164° C. Elemental analysis of the product indicates that it has the composition

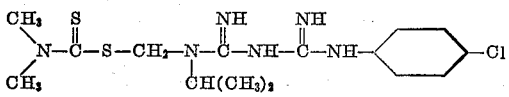

which is 1-(p-chlorophenyl)-5-(dimethylthiocarbamyl-mercaptomethyl)-5-isopropylbiguanide.

The novel compounds of the above examples have been tested and found to be highly active as rodent repellents. In addition, the product of Examples 1 and 2 has been shown to be an excellent, alkali-stable bacteriostat, capable of being incorporated into soap to form a germicidal detergent.

The details of the above examples may be varied within the skill of those engaged in this art. Thus, in lieu of dimethylamine in Examples 2 and 3, any other lower dialkyl amine may be employed, for instance, diethylamine, methylethylamine, dipropylamine (n or iso), methylpropylamine, or the dibutylamines. In lieu of the specific guanidines named in Examples 1 to 5, any of the others named hereinabove may be employed.

I claim as my invention:

1. A compound of the formula

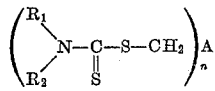

wherein $n$ is an integer from 1 to 2, $R_1$ and $R_2$ are lower alkyl radicals, while A is the radical obtained by removing from 1 to 2 H-atoms from the amido groups of a guanidine compound of the formula

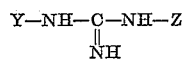

wherein Y is a member of the group consisting of hydrogen, lower alkyl and aryl, while Z is a member of the group consisting of hydrogen, lower alkyl, aryl, cyano, amidino and arylamidino, the terms aryl being defined as monocyclic aryl radicals which are free of ionizable substituents.

2. 3-cyano-1-(dimethylthiocarbamyl-mercaptomethyl)-guanidine.

3. 1 - cyano - 1,3-bis(dimethylthiocarbamyl-mercaptomethyl)guanidine.

4. 1-(dimethylthiocarbamyl - mercaptomethyl)-1,3-di-o-tolylguanidine.

5. 1 - (p-chlorophenyl)-5-(dimethylthiocarbamyl-mercaptomethyl)-5-isopropylbiguanide.

References Cited in the file of this patent

UNITED STATES PATENTS

| | | |
|---|---|---|
| Re. 22,750 | Tisdale et al. | Apr. 30, 1946 |
| 2,068,355 | Sibley | Jan. 19, 1937 |
| 2,477,872 | Haury | Aug. 2, 1949 |
| 2,763,649 | Albrecht | Sept. 18, 1956 |
| 2,842,583 | Meuly | July 8, 1958 |

UNITED STATES PATENT OFFICE
Certificate of Correction

Patent No. 2,910,497                                          October 27, 1959

Walter C. Meuly

It is hereby certified that error appears in the printed specification of the above numbered patent requiring correction and that the said Letters Patent should read as corrected below.

Column 2, lines 25 to 28, Example 1, the formula should appear as shown below instead of as in the patent:

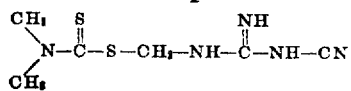

Signed and sealed this 26th day of April 1960.

[SEAL]

Attest:
KARL H. AXLINE,
*Attesting Officer.*

ROBERT C. WATSON,
*Commissioner of Patents.*